S. E. SURFACE.
ICE CREAM DISHER.
APPLICATION FILED DEC. 9, 1913.
1,168,919.
Patented Jan. 18, 1916.
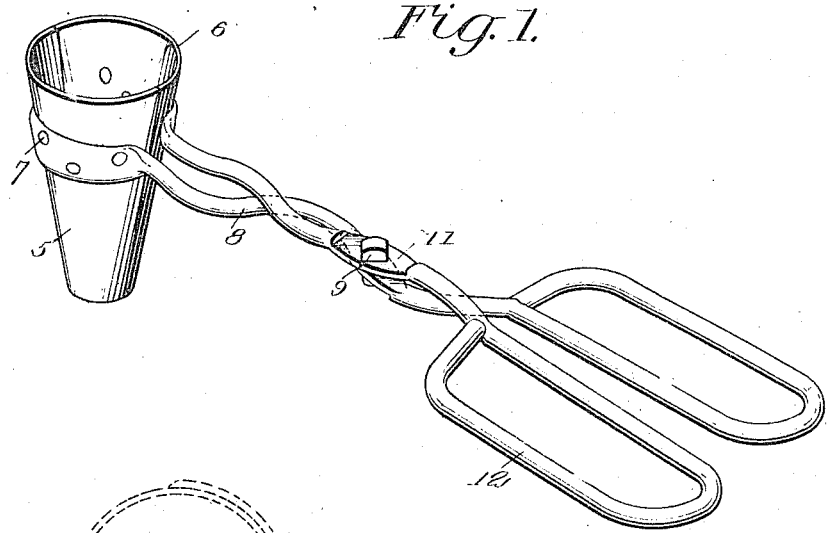
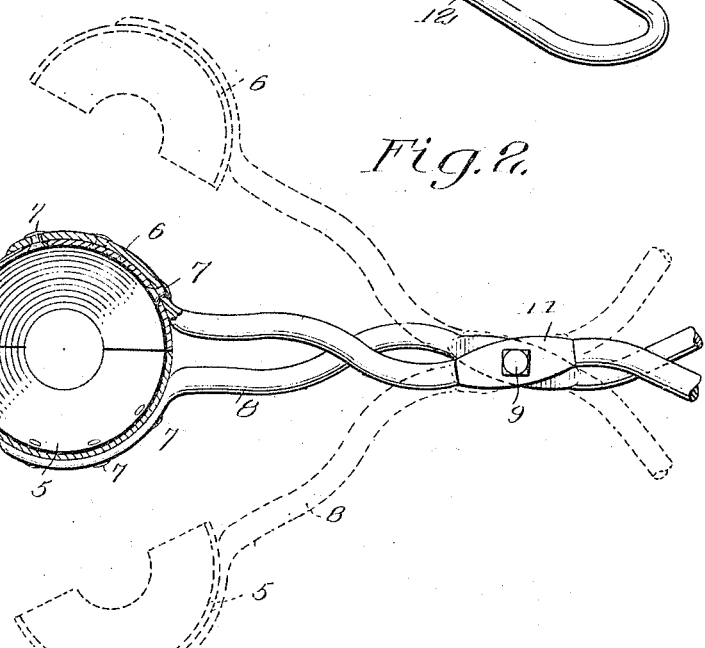
WITNESSES
S. E. Wade.
Alan F. Garner.
INVENTOR
SAMUEL E. SURFACE,
BY Munn & Co.
ATTORNEYS

UNITED STATES PATENT OFFICE.

SAMUEL ELLSWORTH SURFACE, OF STICKNEY, SOUTH DAKOTA, ASSIGNOR TO MELVIN O. McLAUGHLIN, OF YORK, NEBRASKA.

ICE-CREAM DISHER.

1,168,919. Specification of Letters Patent. Patented Jan. 18, 1916.

Application filed December 9, 1913. Serial No. 805,518.

*To all whom it may concern:*

Be it known that I, SAMUEL E. SURFACE, a citizen of the United States, and a resident of Stickney, in the county of Aurora and State of South Dakota, have invented a new and useful Improvement in Ice-Cream Dishers, of which the following is a specification.

This invention relates to an ice cream disher and one of the principal objects thereof is to provide a disher or scoop which may be used to advantage in filling cones without wasting the cream, as well as being useful in measuring ice cream for dispensation in dishes.

Another object is to provide a device of the class described, which will be simple, durable, efficient in operation, inexpensive to manufacture, and which may be kept in a sanitary condition.

With these and other objects in view, the invention resides in the construction, combination and arrangement of parts hereinafter more fully described and claimed, and illustrated in the accompanying drawing in which like characters of reference indicate like parts throughout the figures, of which—

Figure 1 represents a perspective view of the device, and Fig. 2 represents a horizontal sectional view thereof, showing the scoop in open position in dotted lines.

Referring more particularly to the drawing the disher comprising a hollow, inverted, frusto-conical scoop 5, open at both ends and composed of a pair of similarly formed semi-cone-shaped elements 6, each of which, above the center thereof, is secured by means of rivets 7, to the inner, flattened, curved end of one of the shanks 8, which shanks are compoundly curved to add to the appearance of the device, and are pivotally connected as at 9 by means of a pin extending through flattened portions 11 of the shanks. The outer ends of the shanks are looped in opposite directions to form similarly shaped equi-sized handles 12 by means of which the device may be manipulated.

By separating the outer ends of the shanks 8, the inner ends thereof will be separated, and consequently, elements 6, which are oppositely disposed with their edges abutting, will be separated. The scoop may be filled with cream in the ordinary manner and held above a cone, with the small end directed toward the cone, and the elements then separated whereby the cream will be dropped into the cone without the waste ordinarily incident to the use of the well-known type of disher in filling a cone, whereby the large end of a cone or similarly shaped mass of cream is precipitated into the cone, generally with a loss of a portion of the cream.

The inner flattened ends of the shanks have their edges rounded to merge with the outer surfaces of the cone elements 6, so that no crevices or cracks will be left in which cream might lodge, or in which rust might accumulate.

The device may be made of a baser metal plated with nickel or other suitable metal, but it will be understood that I do not limit myself to any particular substance or matter of which the disher may be made.

Although I have described the preferred embodiment of my invention, I may desire to make such changes in the construction, combination and arrangement of parts as do not depart from the spirit of the invention, and the scope of the appended claim.

I claim:

The herein described ice cream disher comprising a pair of twisted shanks pivotally connected together and crossing each other at points on both sides of and spaced from the pivot point, said shanks being extended and looped at one end to form handles and at their opposite ends being provided each with an arcuate terminal, and a pair of independent similarly shaped scoop members secured each to one of the arcuate terminals.

SAMUEL ELLSWORTH SURFACE.

Witnesses:
J. E. BACHMORE,
O. E. O'BRIEN.